(12) United States Patent
Shinkai et al.

(10) Patent No.: US 11,994,870 B2
(45) Date of Patent: May 28, 2024

(54) WORKING VEHICLE

(71) Applicant: KUBOTA CORPORATION, Osaka (JP)

(72) Inventors: Atsushi Shinkai, Sakai (JP); Kotaro Yamaguchi, Sakai (JP); Kazuo Sakaguchi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 341 days.

(21) Appl. No.: 17/338,759

(22) Filed: Jun. 4, 2021

(65) Prior Publication Data

US 2021/0294345 A1    Sep. 23, 2021

Related U.S. Application Data

(63) Continuation of application No. PCT/JP2019/049844, filed on Dec. 19, 2019.

(30) Foreign Application Priority Data

Dec. 26, 2018 (JP) ................. 2018-243523

(51) Int. Cl.
*G05D 1/02* (2020.01)
*A01B 69/00* (2006.01)
(Continued)

(52) U.S. Cl.
CPC ......... *G05D 1/0246* (2013.01); *A01B 69/001* (2013.01); *A01B 79/005* (2013.01); *G05D 1/0088* (2013.01); *G05D 1/0219* (2013.01); *G06F 18/2413* (2023.01); *G06V 20/10* (2022.01); *G05D 2201/0201* (2013.01)

(58) Field of Classification Search
CPC .. G05D 1/0246; G05D 1/0088; G05D 1/0219; G05D 2201/0201; G05D 1/0278; A01B 69/001; A01B 79/005; G06F 18/2413; G06V 20/10
See application file for complete search history.

(56) References Cited

U.S. PATENT DOCUMENTS 9,703,002 B1 * 7/2017 Olsson ................. G01V 3/12
11,250,054 B1 * 2/2022 Campbell ............ G06V 20/582
(Continued)

FOREIGN PATENT DOCUMENTS

JP    02-96817 U    8/1990
JP    06-28032 A    2/1994
(Continued)

OTHER PUBLICATIONS

Official Communication issued in International Patent Application No. PCT/JP2019/049844, dated Mar. 17, 2020.
(Continued)

*Primary Examiner* — Sohana Tanju Khayer
(74) *Attorney, Agent, or Firm* — Keating & Bennett, LLP

(57) ABSTRACT

A working vehicle includes a vehicle body capable of traveling, a ground working device attached to the vehicle body to perform ground working, an imaging device located on the vehicle body to image a ground working result after the ground working by the ground working device, and a storage to store a ground working image representing the ground working result taken by the imaging device.

11 Claims, 16 Drawing Sheets

(51) Int. Cl.
*A01B 79/00* (2006.01)
*G05D 1/00* (2006.01)
*G06F 18/2413* (2023.01)
*G06V 20/10* (2022.01)

(56) References Cited

U.S. PATENT DOCUMENTS

| | | | |
|---|---|---|---|
| 2013/0238305 A1* | 9/2013 | Digiacobbe | G01S 13/89 |
| | | | 703/6 |
| 2015/0178572 A1* | 6/2015 | Omer | G08G 1/0141 |
| | | | 382/108 |
| 2016/0076228 A1* | 3/2016 | Nau | E02F 3/842 |
| | | | 701/50 |
| 2016/0134844 A1* | 5/2016 | Casper | H04N 7/181 |
| | | | 348/135 |
| 2017/0011270 A1* | 1/2017 | Kamada | G06V 20/56 |
| 2017/0112043 A1* | 4/2017 | Nair | A01B 33/16 |
| 2017/0248946 A1* | 8/2017 | Ogura | G05D 1/0038 |
| 2017/0312916 A1* | 11/2017 | Williams | G05D 1/0219 |
| 2017/0364073 A1* | 12/2017 | Guy | B25J 9/00 |
| 2018/0116124 A1* | 5/2018 | Murray | A01B 69/008 |
| 2018/0129210 A1* | 5/2018 | Achtelik | G01C 5/00 |
| 2018/0325012 A1 | 11/2018 | Ferrari et al. | |
| 2019/0047527 A1* | 2/2019 | Falconer | B60W 10/184 |
| 2019/0150357 A1* | 5/2019 | Wu | H04N 7/188 |
| 2019/0188495 A1* | 6/2019 | Zhao | G06F 18/24 |
| 2019/0246556 A1* | 8/2019 | Stoller | A01C 23/007 |
| 2019/0320580 A1 | 10/2019 | Haneda et al. | |
| 2019/0392573 A1* | 12/2019 | Ferrari | G06F 18/217 |
| 2020/0048869 A1* | 2/2020 | Christofferson | E02F 9/264 |
| 2020/0048870 A1* | 2/2020 | Peat | E02F 3/764 |
| 2020/0102718 A1* | 4/2020 | Cline | E02F 3/845 |
| 2020/0299934 A1* | 9/2020 | Ono | E02F 3/7654 |
| 2020/0349368 A1* | 11/2020 | Mayster | G06V 20/582 |
| 2021/0136993 A1* | 5/2021 | Revelli | G05D 1/0088 |
| 2021/0251452 A1* | 8/2021 | Meulendijks | A47L 9/2826 |
| 2021/0276529 A1* | 9/2021 | Han | B60W 30/18172 |
| 2022/0053688 A1* | 2/2022 | Mertens | A01C 7/205 |

FOREIGN PATENT DOCUMENTS

| | | |
|---|---|---|
| JP | 2013-110977 A | 6/2013 |
| JP | 2017-117257 A | 6/2017 |
| JP | 2018-108040 A | 7/2018 |
| JP | 2018-110037 A | 7/2018 |
| WO | 2016/017367 A1 | 2/2016 |

OTHER PUBLICATIONS

Official Communication issued in corresponding European Patent Application No. 19904534.5, dated Sep. 2, 2022.

* cited by examiner

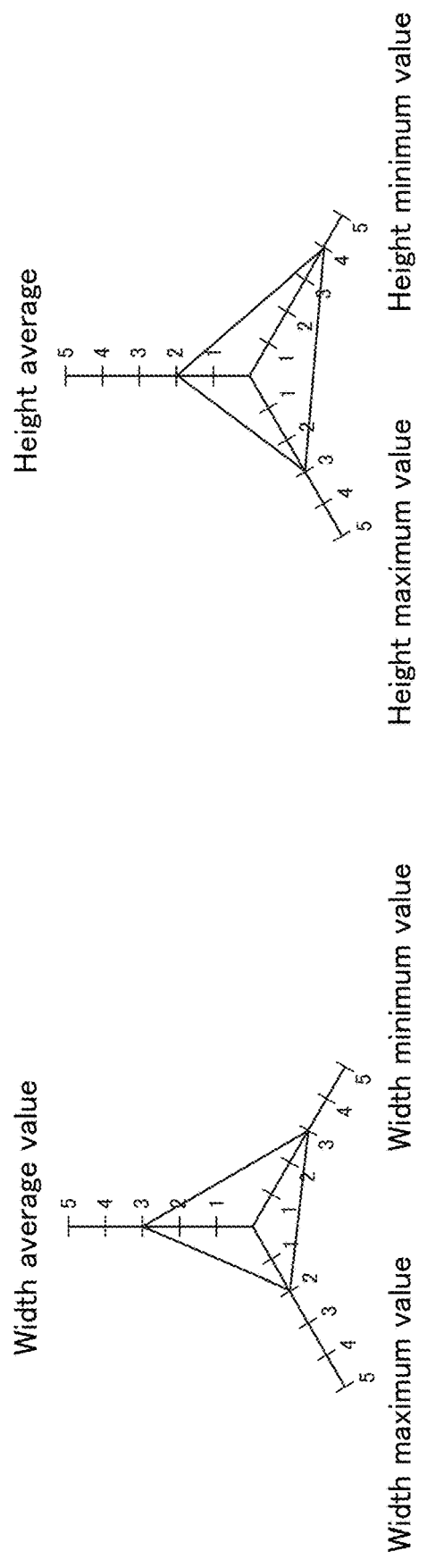

WORKING VEHICLE

CROSS REFERENCE TO RELATED APPLICATIONS

This application is a continuation application of International Application No. PCT/JP2019/049844, filed on Dec. 19, 2019, which claims the benefit of priority to Japanese Patent Application No. 2018-243523 filed on Dec. 26, 2018. The entire contents of each of these applications are hereby incorporated herein by reference.

BACKGROUND OF THE INVENTION

1. Field of the Invention

The present invention relates to a working vehicle such as a tractor.

2. Description of the Related Art

Japanese Unexamined Patent Application Publication No. 2018-110037 is known as disclosing a technique for creating an agricultural work plan for an agricultural machine such as a tractor. An agricultural support system of Japanese Unexamined Patent Application Publication No. 2018-110037 includes a server, a work instruction unit, an acquisition unit, and a display unit. The server includes a working menu storage portion that stores working menus including agricultural fields, agricultural workings, and dates of implementation. The work instruction unit transmits the working menus to an external party. The acquisition unit acquires the working menus transmitted by the work instruction unit. The display unit displays a list of the working menus including the agricultural fields, agricultural workings, and respective dates of implementation.

In addition, Japanese Unexamined Patent Application Publication No. 2017-117257 is known as disclosing a technique in which a camera is mounted on an agricultural machine. An autonomous traveling system for a working vehicle in Japanese Unexamined Patent Application Publication No. 2017-117257 has a camera that takes images of the front of the vehicle and a controller that performs a steering control based on the images taken by the camera.

SUMMARY OF THE INVENTION

A working vehicle includes a vehicle body capable of traveling, a ground working device attached to the vehicle body to perform ground working, an imaging device located on the vehicle body to image a ground working result after the ground working by the ground working device, and a storage to store a ground working image representing the ground working result taken by the imaging device.

The working vehicle includes a first data acquirer to acquire the ground working image and operation information of the vehicle body. The storage stores the ground working image and the operation information acquired by the first data acquirer.

The working vehicle includes a second data acquirer to acquire the ground working image and operation information of the ground working device. The storage stores the ground working image and the operation information acquired by the second data acquirer.

The working vehicle includes a display to display the ground working image including the ground working result.

The imaging device images, as the ground working result, a ground surface condition after the ground working.

The working vehicle includes a working grader to grade the ground working based on the ground working image taken by the imaging device.

The working grader performs the grading based on a first ground surface condition obtained from the ground working image after the ground working and a second ground surface condition serving as a reference for the ground working.

The working vehicle includes a display to display a grading result graded by the working grader.

The working vehicle includes a controller configured or programmed to change, based on the ground working image, a traveling condition of the vehicle body or the ground working to be performed by the ground working device.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 8B is a view illustrating an example of grading to the plow.

FIG. 8C is a view illustrating an example of grading to the ridger.

DETAILED DESCRIPTION OF THE PREFERRED EMBODIMENTS

Figure 1:
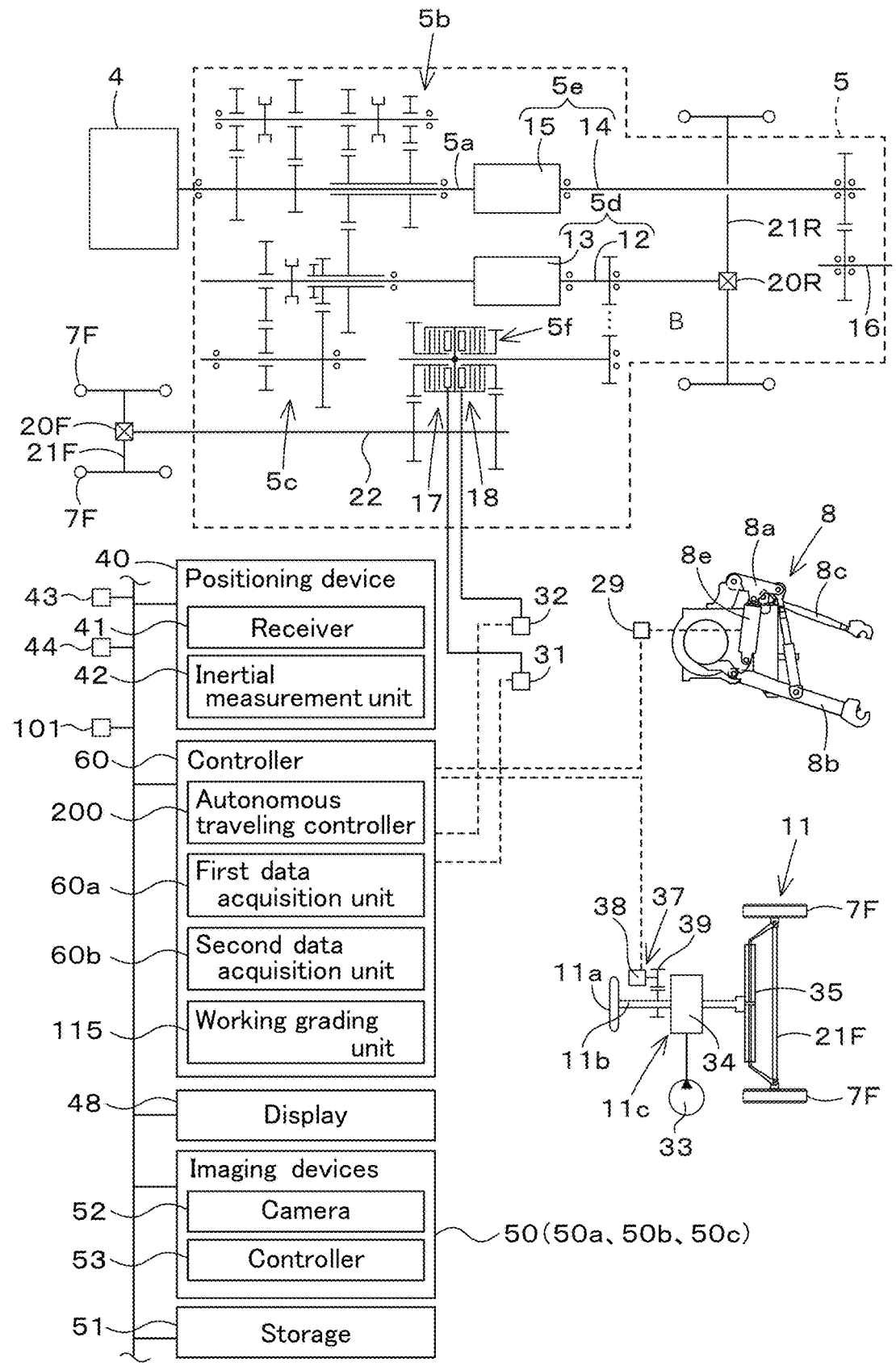
FIG. 1 is a view illustrating a configuration of a working machine and a control block diagram.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to the drawings, preferred embodiments of the present invention will be described below.

Figure 12:
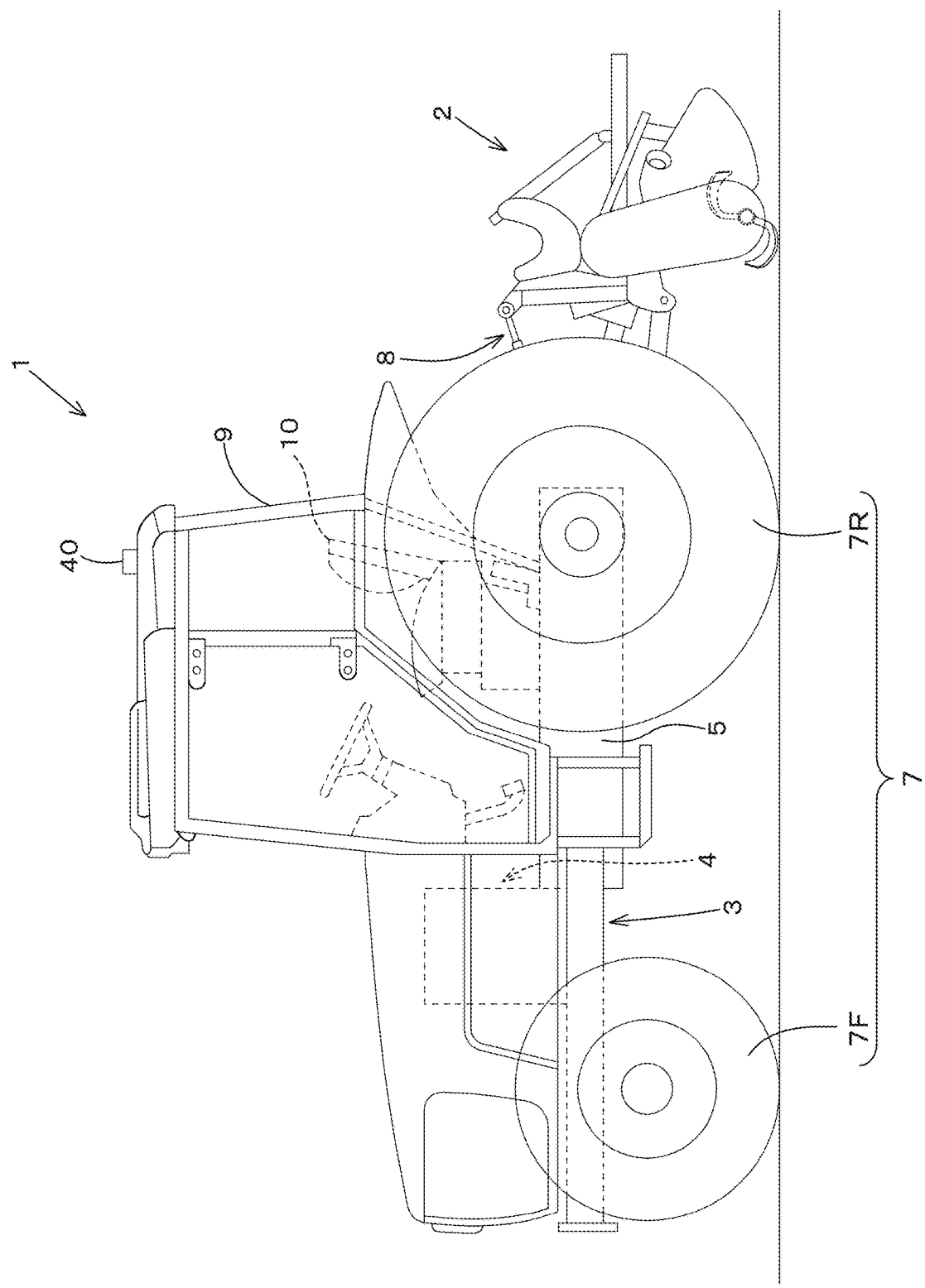
FIG. 12 is a whole view of a tractor.

FIG. 12 shows a control block diagram of a working machine. The working machine is an agricultural machine such as a tractor, a combine harvester, and a rice transplanter. The tractor will be employed as an example to explain the working machine.

As shown in FIG. 12, a tractor 1 is provided with a vehicle (referred to as a vehicle body) 3 including a traveling device 7, a prime mover 4, and a transmission device 5. The traveling device 7 includes front wheels 7F and rear wheels 7R. The front wheels 7F may be of a tire type or a crawler type. The rear wheels 7R may also be of the tire or crawler type. The prime mover 4 is a diesel engine, an electric motor, or the like, and in this preferred embodiment, the prime mover 4 preferably is a diesel engine. The transmission device 5 is configured to select a speed of rotation propelling the traveling device 7 through gear shifting, and is configured to switch the traveling direction of the traveling device 7 between forward traveling and backward traveling. A cabin 9 is located on the vehicle body 3, and a driver seat 10 is provided inside the cabin 9.

On a rear portion of the vehicle body 3, a lifting device 8 is located, which includes a three-point linkage mechanism or the like. A ground working machine 2 is capable of being attached to/detached from the lifting device 8. When the ground working machine 2 is attached to the lifting device 8, the ground working machine 2 can be towed by the vehicle body 3. The ground working device 2 is configured to perform workings on soil (that is, a ground surface) of an agricultural field and change a shape of the ground surface. The ground working device 2 is, for example, a cultivator, a ground leveler, a crusher, a ridger, or the like. In particular, the ground working machine 2 is a rotary cultivator, a subsoiler, a plow, a short disc, a power harrow, a ploughing machine, a ridger, or the like. In FIG. 12, an example is shown in which a cultivator is attached to as the ground working device 2.

As shown in FIG. 1, the transmission device 5 is provided with a main shaft (that is, a propulsion shaft) 5a, a main transmission 5b, a sub transmission 5c, a shuttle unit 5d, a PTO power transmission 5e, and a front gear transmission 5f. The propulsion shaft 5a is rotatably supported by a housing case of the transmission device 5, and a power from a crankshaft of the engine 4 is transmitted to the propulsion shaft 5a. The main transmission 5b includes a plurality of gears and a shifter (or shifters) configured to change connections between the gears. The main transmission 5b changes inputted rotation of the propulsion shaft 5a and outputs the rotation (changes a speed of the rotation) by selecting suitable gears to be drivingly connected (or engaged) with the shifter (or shifters).

Similar to the main transmission 5b, the sub transmission 5c includes a plurality of gears and a shifter (or shifters) configured to change connections between the gears. The sub transmission 5c changes inputted rotation of the main transmission portion 5b and outputs the rotation (changes a speed of the rotation) by selecting suitable gears to be drivingly connected (or engaged) with the shifter (or shifters).

The shuttle unit 5d includes a shuttle shaft 12 and a reverser 13. Power output from the sub transmission portion 5c is transmitted to the shuttle shaft 12 through the gears and the like. The reverser 13 constituted of, for example, a hydraulic clutch, and switches a rotational direction of the shuttle shaft 12, that is, selects either forward traveling or backward traveling of the tractor 1, by engaging and disengaging the hydraulic clutch. The shuttle shaft 12 is connected to a rear wheel differential device 20R. The rear wheel differential device 20R rotatably supports rear axles 21R to which the rear wheels 7R are attached.

The PTO power transmission 5e includes a PTO propulsion shaft 14 and a PTO clutch 15. The PTO propulsion shaft 14 is rotatably supported and is capable of transmitting a power from the propulsion shaft 5a. The PTO propulsion shaft 14 is connected to the PTO shaft 16 through gears or the like. The PTO clutch 15 includes a hydraulic clutch or the like and is switched between a state in which a power of the propulsion shaft 5a is transmitted to the PTO propulsion shaft 14 and a state in which the power of the propulsion shaft 5a is not transmitted to the PTO propulsion shaft 14 by engaging and disengaging the hydraulic clutch.

The front transmission 5f includes a first clutch 17 and a second clutch 18. The first clutch 17 and the second clutch are capable of transmitting a power from the propulsion shaft 5a. For example, a power of the shuttle shaft 12 is transmitted through gears and transmission shafts. Power from the first clutch 17 and power from the second clutch 18 can be transmitted to a front axle 21F through a front transmission shaft 22. Specifically, the front transmission shaft 22 is connected to a front wheel differential device 20F, and the front wheel differential device 20F rotatably supports the front axles 21F to which the front wheels 7F are attached.

The first clutch 17 and the second clutch 18 include hydraulic clutches or the like. A fluid line is connected to the first clutch 17, and the fluid line is connected to a first operation valve 31 to which hydraulic fluid output from a hydraulic pump is supplied. The first clutch 17 is switched between an engaged state and a disengaged state depending on an opening degree of the first operation valve 31. A fluid line is connected to the second clutch 18, and the fluid line is connected to a second operation valve 32. The second clutch 18 is switched between the engaged state and the disengaged state depending on an opening degree of the second operation valve 32. The first operation valve 31 and the second operation valve 32 are, for example, two-position switching valves with solenoid valves, and when solenoids of the solenoid valves are magnetized or demagnetized, the clutch is switched between the engaged state and the disengaged state.

When the first clutch 17 is in the disengaged state and the second clutch 18 is in the engaged state, a power of the shuttle shaft 12 is transmitted to the front wheels 7F through the second clutch 18. This results in four-wheel drive (that is, 4WD) in which the front and rear wheels are driven by the power and the rotational speeds of the front and rear wheels are the same or substantially the same (that is, in a 4WD constant velocity state). On the other hand, when the first clutch 17 is in the engaged state and the second clutch 18 is in the disengaged state, the vehicle is in the four-wheel drive and the rotational speeds of the front wheels are faster than those of the rear wheels (that is, on a 4WD increased velocity state). In addition, when the first and second clutches 17 and 18 are in the engaged state, the vehicle is in two-wheel drive (that is, 2WD) in which the rear wheels are driven by power because the power of the shuttle shaft 12 is not transmitted to the front wheels 7F.

Figure 2:
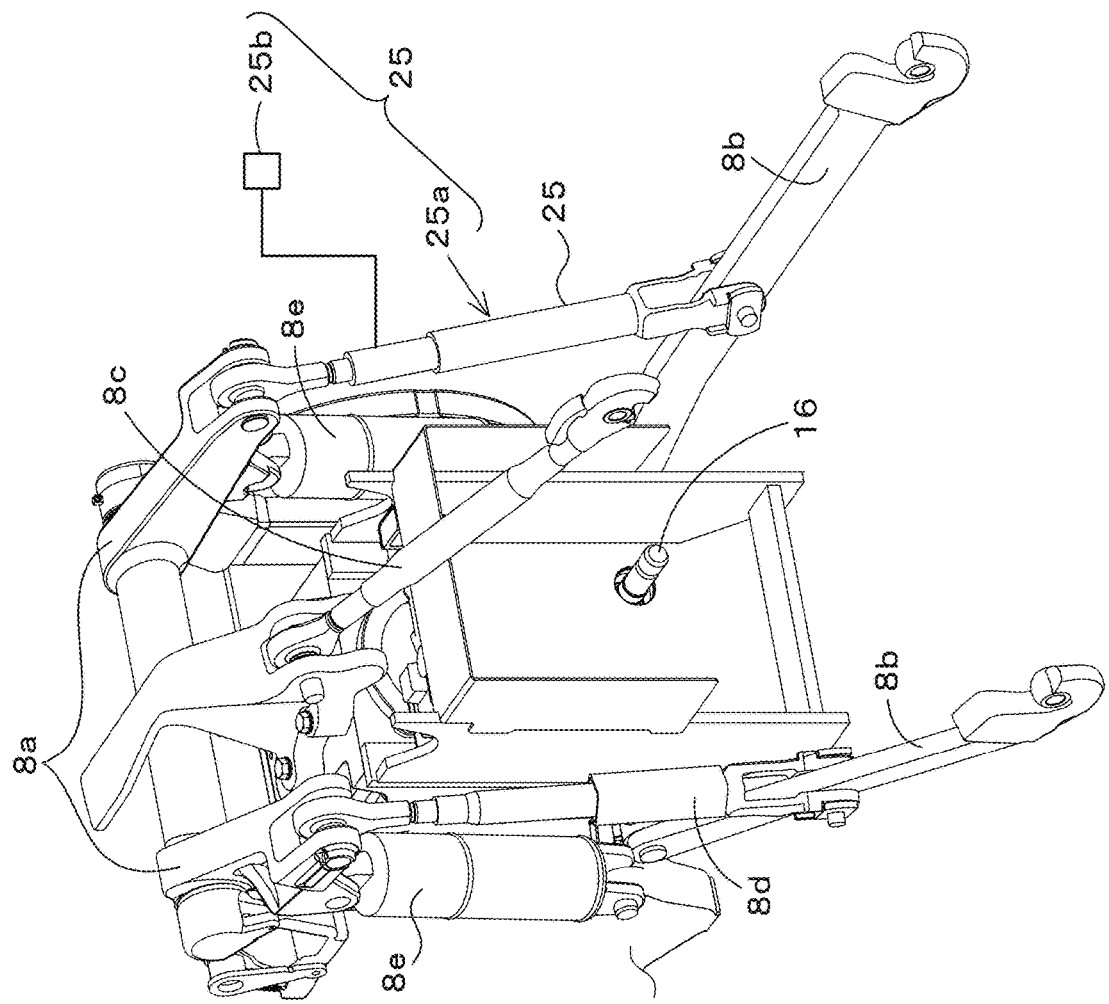
FIG. 2 is a perspective view of a lifting device.

As shown in FIG. 2, the lifting device 8 includes lift arms 8a, lower linkages 8b, a top linkage 8c, lift rods 8d, and lift cylinders 8e. The front ends of the lift arms 8a are supported swingably upward or downward on the upper rear portion of the housing case (that is, a transmission case) that houses the transmission device 5. The lift arms 8a are swung (lifted and lowered) by driving of the lift cylinders 8e. The lift cylinders 8e include hydraulic cylinders. The lift cylinders 8e are connected to the hydraulic pump 33 through a control valve 29. The control valve 29 is a solenoid valve or the like, and is configured to stretch and contract the lift cylinders 8e.

Front ends of the lower linkages 8b are supported swingably upward or downward on the rear lower portion of the transmission device 5. A front end of the top linkage 8c is supported swingably upward or downward on a rear portion of the transmission device 5 above the lower linkage 8b. The lift rods 8d connect the lift arms 8a to the lower linkages 8b. The ground working machine 2 is connected to rear portions of the lower linkages 8b and a rear portion of the top linkage 8c. When the lift cylinder 8e is driven (stretched and contracted), the lift arms 8a are lifted and lowered, and the lower linkages 8b connected to the lift arms 8a with the lift rods 8d are lifted and lowered. In this manner, the ground working machine 2 is swung upward or downward (that is, lifted or lowered) using front portions of the lower linkages 8b as fulcrums.

A posture changeover device 25 is located on the lifting device 8. The posture changeover device 25 is configured to change a posture of the ground working machine 2 attached to the vehicle body 3. The posture changeover device 25 includes a changeover cylinder 25a including a hydraulic cylinder, and a control valve 25b. The changeover cylinder 25a is fluidly connected to a hydraulic pump through the control valve 25b. The control valve 25b is a solenoid valve or the like configured to extend and contract the changeover cylinder 25a. The changeover cylinder 25a connects the lift arms 8a to the lower linkages 8b.

As shown in FIG. 1, the tractor 1 is provided with a positioning device 40. The positioning device 40 is capable of detecting its own position (that is, positioning information including the latitude and longitude) through satellite positioning systems (that is, positioning satellites) such as the D-GPS, the GPS, the GLONASS, the HOKUTO, the GALILEO, and the MICHIBIKI. That is, the positioning device 40 receives satellite signals (that is, positions of the positioning satellites, transmission times, correction information, and the like) transmitted from the positioning satellites, and detects a position (for example, the latitude and longitude) based on the satellite signals. The positioning device 40 includes a receiver 41 and an inertial measurement unit (referred to as an IMU) 42. The receiver 41 includes an antenna or the like to receive satellite signals transmitted from the positioning satellites, and is mounted on the vehicle body 3 separately from the inertial measurement unit 42. An attachment location of the receiver 41 is not limited to that described in the present preferred embodiment. The inertial measurement unit 42 includes an acceleration sensor that detects accelerations, a gyro sensor that detects angular velocities, and the like. The inertial measurement unit 42 is configured to detect a rolling angle, a pitching angle, a yawing angle, and the like of the vehicle body 3.

As shown in FIG. 1, the tractor 1 is provided with a steering device 11. The steering device 11 includes a handling wheel (that is, a steering wheel) 11a, a rotating shaft (that is, a steering shaft) 11b that rotates along with the rotating of the steering wheel 11a, and an assisting mechanism (that is, a power steering mechanism) 11c that assists the steering of the steering wheel 11a. The assisting mechanism 11c includes a hydraulic pump 33, a control valve 34 to which hydraulic fluid output from the hydraulic pump 33 is supplied, and a steering cylinder 35 to be operated by the control valve 34. The control valve 34 is a solenoid valve configured to operate based on a control signal. For example, the control valve 34 is a three-position switching valve that is capable of being switched with movement of a spool or the like. The control valve 34 can also be switched by the steering of the steering shaft 11b. The steering cylinder 35 is operably connected to arms (that is, knuckle arms) for changing directions of the front wheels 7F.

Thus, when the handling wheel 11a is operated, switching positions and an opening degree of the control valve 34 are switched in accordance with the handling wheel 11a, and the steering directions of the front wheels 7F can be changed when the steering cylinder 35 is stretched and contracted leftward or rightward according to the switching positions and the opening degree of the control valve 34.

In addition, the steering device 11 includes an autonomous steering mechanism 37. The autonomous steering mechanism 37 is configured or programmed to perform autonomous steering of the vehicle body 3, and automatically steers the vehicle body 3 based on a position of the vehicle body 3 (referred to as a vehicle position) detected by the positioning device 40. The autonomous steering mechanism 37 is provided with a steering motor 38 and a gear mechanism 39. The steering motor 38 is configured to control a rotation direction, a rotation speed, a rotation angle, and the like based on the vehicle position. The gear mechanism 39 includes gears located on the steering shaft 11b and configured to rotate integrally with the steering shaft 11b, and gears located on a rotation shaft of the steering motor 38 and configured to rotate integrally with the rotation shaft. When the rotation shaft of the steering motor 38 rotates, the steering shaft 11b automatically rotates (turns) through the gear mechanism 39, and the steering directions of the front wheels 7F can be changed so that the vehicle position matches a scheduled traveling line R1. The autonomous steering mechanism 37 described above is just an example and is not limited to the configuration described above.

As shown in FIG. 1, a controller (referred to as a vehicle controller) 60 is provided with an autonomous traveling controller 200 configured or programmed to perform autonomous traveling. The autonomous traveling controller 200 steers the vehicle body 3 based on a predetermined scheduled traveling line R1 and steers the vehicle body 3 at a predetermined speed (that is, a vehicle speed). The scheduled traveling line R1 is stored in the controller 60 in advance. The scheduled traveling line R1 may be set through a computer such as a personal computer (that is, a PC), a smartphone (that is, a multi-function cell phone), or a tablet, or through operating of a display 48 installed on the vehicle body 3. Or, a route on which the vehicle body 3 manually travels may be set as the scheduled traveling line R1.

The autonomous traveling controller 200 includes electrical and electronic circuits installed in the controller 60, computer programs stored in the controller 60, or the like. The autonomous traveling controller 200 controls the steering motor 38 of the autonomous steering mechanism 37 so that the vehicle body 3 travels on the scheduled traveling line R1 based on the control signals output from the controller 60.

Figure 3:
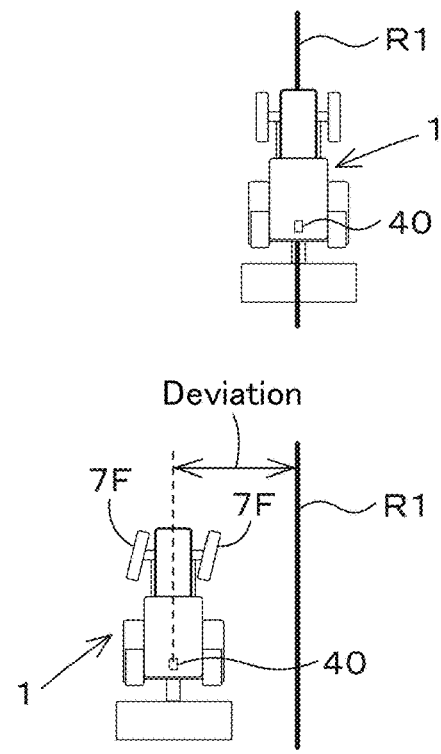
FIG. 3 is an explanation view explaining steering.
Figure 3:
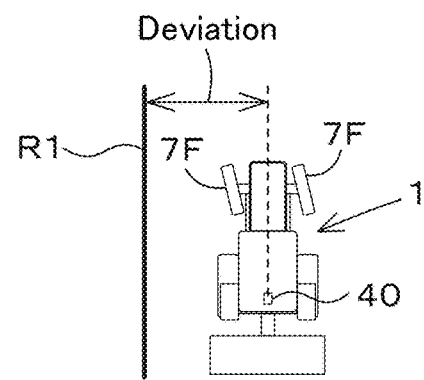
Figure 3:
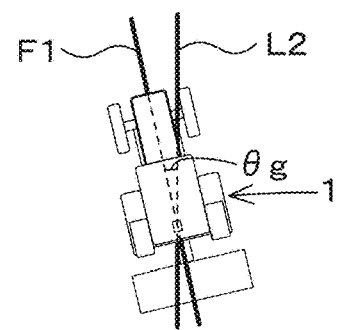

As shown in FIG. 3, when a deviation between the vehicle position and the scheduled traveling line R1 is less than a threshold value, the autonomous traveling controller 200 maintains the rotation angle of the rotation axis of the steering motor 38. When the deviation between the vehicle position and the scheduled traveling line R1 is the threshold value or less and the tractor 1 is located leftward relative to the scheduled traveling line R1, the autonomous traveling controller 200 rotates the rotation axis of the steering motor 38 so that the tractor 1 is turned rightward. When the deviation between the vehicle position and the scheduled traveling line R1 is the threshold value or more and the tractor 1 is located rightward relative to the scheduled traveling line R1, the autonomous traveling controller 200 rotates the rotation axis of the steering motor 38 so that the tractor 1 is turned leftward. In the present preferred embodiment, the steering angle of the steering device 11 is changed based on the deviation between the vehicle position and the scheduled traveling line R1. Alternatively, when an orientation of the scheduled traveling line R1 differs from an orientation (referred to as a vehicle orientation) F1 of a driving direction (that is, a traveling direction) of the tractor 1 (that is, the vehicle body 3), that is, when an angle θg of the vehicle orientation F1 relative to the scheduled traveling line R1 is a threshold value or more, the autonomous traveling controller 200 may set the steering angle so that the angle θg becomes zero (the vehicle orientation F1 matches an orientation of the scheduled traveling line R1). Alternatively, the autonomous traveling controller 200 may set a final steering angle in autonomous steering on the basis of a steering angle obtained based on deviation (that is, a positional deviation) and a steering angle obtained based on orientation (that is, an orientational deviation). The setting of the steering angle in autonomous steering according to the above-described preferred embodiment described is just an example and is not limited thereto. The autonomous traveling controller 200 changes a vehicle speed by shifting gear steps of the main transmission 5b and gear steps of the sub transmission 5c in the transmission device 5 so that the current vehicle speed of the tractor 1 becomes a vehicle speed set corresponding to the scheduled traveling line R1. In the autonomous traveling, when a tilling depth (that is, a target tilling depth) are set corresponding to the scheduled traveling line R1, autonomous tilling is performed so that actual tilling depths match the target tilling depth by controlling the lift cylinders 8e and the like.

The controller 60 is electrically connected to a crank sensor to detect a crank angle, a prime mover revolving sensor to detect a revolving speed of the prime mover 4, an acceleration sensor to detect an operation amount of an acceleration pedal, a traveling detector 43 of the traveling system, such as a vehicle speed sensor to detect a vehicle speed, and a working detector 44 of the working system, such as a PTO rotation sensor to detect a PTO rotating speed.

The controller 60 controls the traveling system and the working system in the tractor 1. For example, the controller 60 performs engine control to change a revolving speed of the prime mover 4 (referred to as a prime mover revolving speed) and the like based on detected values (that is, a crank angle, a revolving speed of prime mover, a vehicle speed, an operation extent of acceleration pedal) detected by the traveling detector 43. The controller 60 performs lifting control to lift and lower the lifting device 8 (that is, the lift arms 8a) based on a lifting switch 101 located near the driver seat 10. When the lifting switch 101 is switched from a neutral position to one position, a lifting signal is input to the controller 60 to lift the lifting device 8 (that is, the lift arms 8a). When the lifting switch 101 is switched from the neutral position to the other position, a lowering signal is input to the controller 60 to lower the lift device 8 (that is, the lift arms 8a). When acquiring the lifting signal, the controller 60 outputs a control signal to the control valve 29 to lift the lifting device 8 to a predetermined position, and when acquiring the lowering signal, the controller 60 outputs a control signal to the control valve 29 to lower the lifting device 8 to a predetermined position.

When the steering angle of the steering device 11 is a predetermined angle or more, for example, an angle corresponding to turning, the controller 60 performs a double-speed control in which the engagement state of the first clutch 17 and the second clutch 18 is automatically changed to make rotational speeds of the front wheels 7F faster than the rotational speeds of the rear wheels.

The controller 60 performs a posture control to fix an angle of the ground working machine 2 in a width direction (that is, an angle of straight line connecting the lower linkages 8b and 8b relative to a horizontal direction) set by the posture changeover device 25. For example, when in a horizontal mode, the controller 60 outputs a control signal to the control valve 25b to extend and contract the changeover cylinder 25a, thus horizontally maintaining the ground working device 2 set by the posture changeover device 25. When in a tilting mode, the controller 60 outputs a control signal to the control valve 25b to stretch and contract the changeover cylinder 25a, thus maintaining the ground working device 2 parallel to an agricultural field (that is, a ground surface), which is set by the attitude change device 25. The horizontal mode and the tilting mode can be switched by a switch or the like located near the driver seat 10.

In the descriptions of the above-described preferred embodiment, the controller 60 performs the engine control, the lifting control, the double-speed control, and the posture control, but the types of controls and the like are not limited thereto. In addition, the engine control, the lifting control, the double-speed control, and the posture control described above are just examples and are not limited to what is described above.

Figure 4:
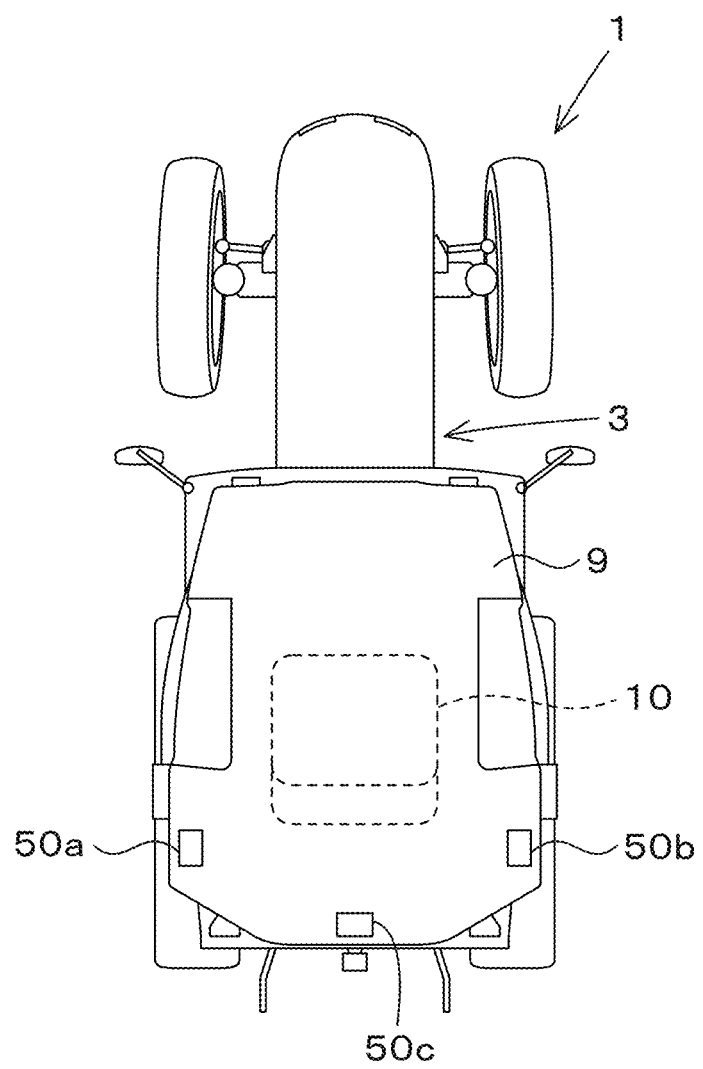
FIG. 4 is a view illustrating a position of an imaging device.

As shown in FIG. 1, the tractor 1 is provided with a plurality of imaging devices 50 and a storage 51. The imaging devices 50 are configured to image results of ground working after the working by the ground working device 2. The imaging devices 50 are located on the vehicle body 3, and imaging directions thereof are orientated toward the ground working device 2. The plurality of imaging devices 50 include a left imaging device 50a located leftward on the vehicle body 3, a right imaging device 50b located rightward on the vehicle body 3, and a rear imaging device 50c provided rearward on the vehicle body 3. As shown in FIG. 4, the left imaging device 50a is attached to a left end of an upper portion of the cabin 9, the right imaging device 50b is attached to a right end of the upper portion of the cabin 9, and the rear imaging device 50c is attached to a rear end of the upper portion of the cabin 9. As shown in FIG. 1, the left imaging device 50a, the right imaging device 50b, and the rear imaging device 50c include respective cameras 52 to take images of results of ground working after working, and respective controllers 53 to control the respective cameras 52. The cameras 52 include CCD cameras or the like, and optical axes of the cameras 52 are orientated toward the ground working device 2. The controllers 53 include arithmetic processing units such as CPUs, and perform various imaging processes.

Figure 5:
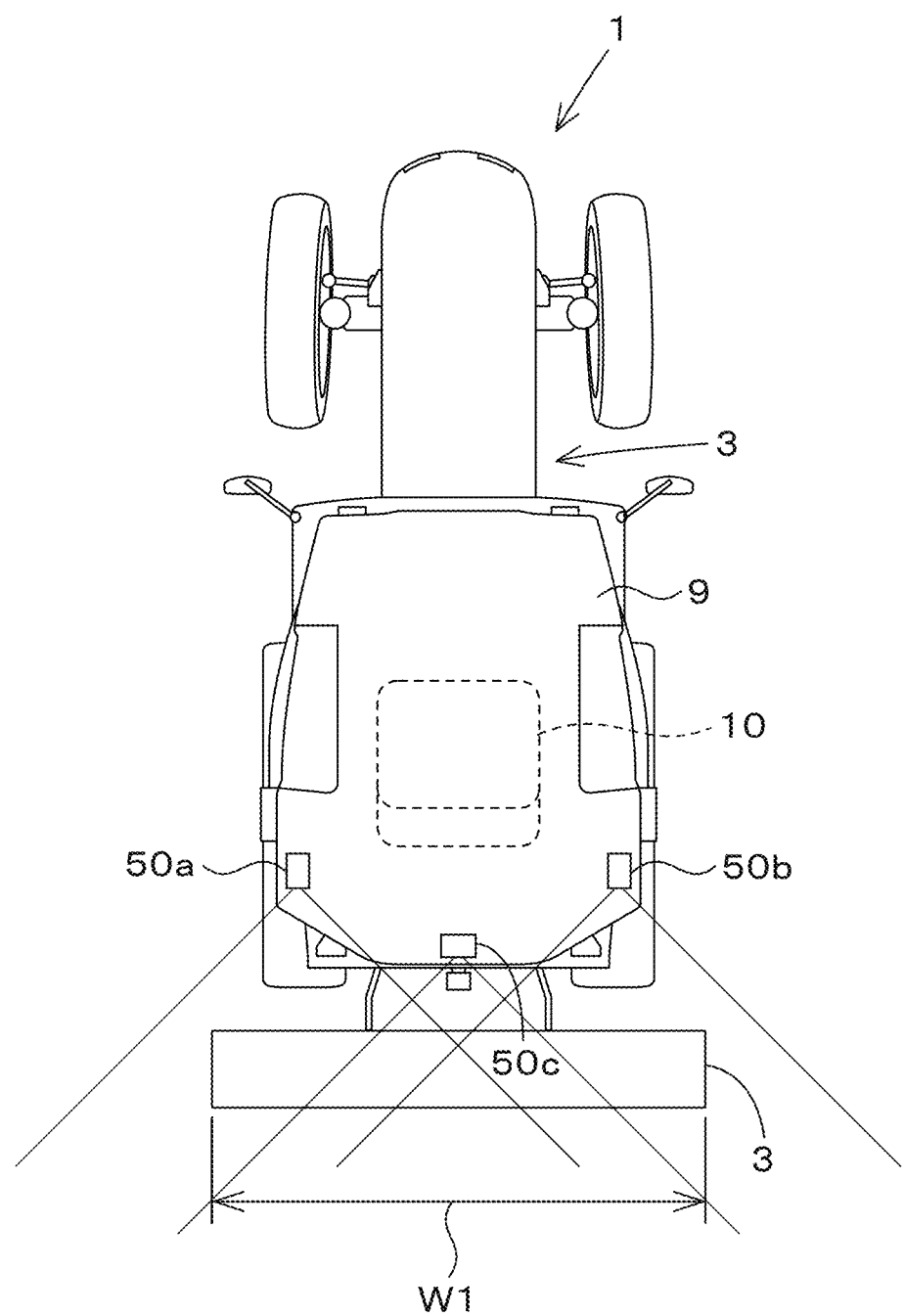
FIG. 5 is a view illustrating a relationship between a working area W1 and an imaging area of the imaging device.

As shown in FIG. 5, the plurality of imaging devices 50 take images so that a working area W1 processed by the ground working device 2 (an area behind the ground working device 2 within the working area W1) as a result of ground working is included in a ground working image. For example, the left imaging device 50a, the right imaging device 50b, and the rear imaging device 50c take images so that images (work results) of the working area W1 is included in combined ground working images when a plurality of ground working images imaged by the left imaging device 50a, the right imaging device 50b, and the rear imaging device 50c are combined. In other words, the left imaging device 50a, the right imaging device 50b, and the rear imaging device 50c take images so that a whole of results of ground working by the ground working device 2 can be grasped from the plurality of ground working images taken by the left imaging device 50a, the right imaging device 50b, and the rear imaging device 50c. More specifically, the plurality of imaging devices 50 (that is, the left imaging device 50a, the right imaging device 50b, and the rear imaging device 50c) image, as the ground working result, a ground surface condition and an unevenness condition of the ground surface after the working by the ground working machine 2.

In the present preferred embodiment, the tractor 1 is provided with the plurality of imaging devices 50, but the number of imaging devices 50 may be one. In this case, the single imaging device 50 takes an image as a result of the ground working so that the working area W1 processed by the ground working device 2 is included in a ground working image.

The controller 60 is configured or programmed to include a first data acquisition unit 60a. When the tractor 1 includes a plurality of imaging devices 50, the first data acquisition unit 60a acquires a plurality of ground working images (called individual images) respectively taken by the plurality of imaging devices 50, for example, the plurality of ground working images (that is, the individual images) each taken by each of the left imaging device 50a, the right imaging device 50b, and the rear imaging device 50c. Alternatively, the first data acquisition unit 60a acquires a ground working image (called a composite image) after combining the plurality of ground working images respectively taken by the left imaging device 50a, the right imaging device 50b, and the rear imaging device 50c into a single image. Alternatively, when the tractor 1 includes one imaging device 50, the first data acquisition unit 60a acquires a ground working image taken by the one imaging device 50 (that is, a single image). A combining process of composite image is performed, for example, by the controller 53 of one of the left imaging device 50a, the right imaging device 50b, and the rear imaging device 50c, or by the controller 60.

Figure 6:
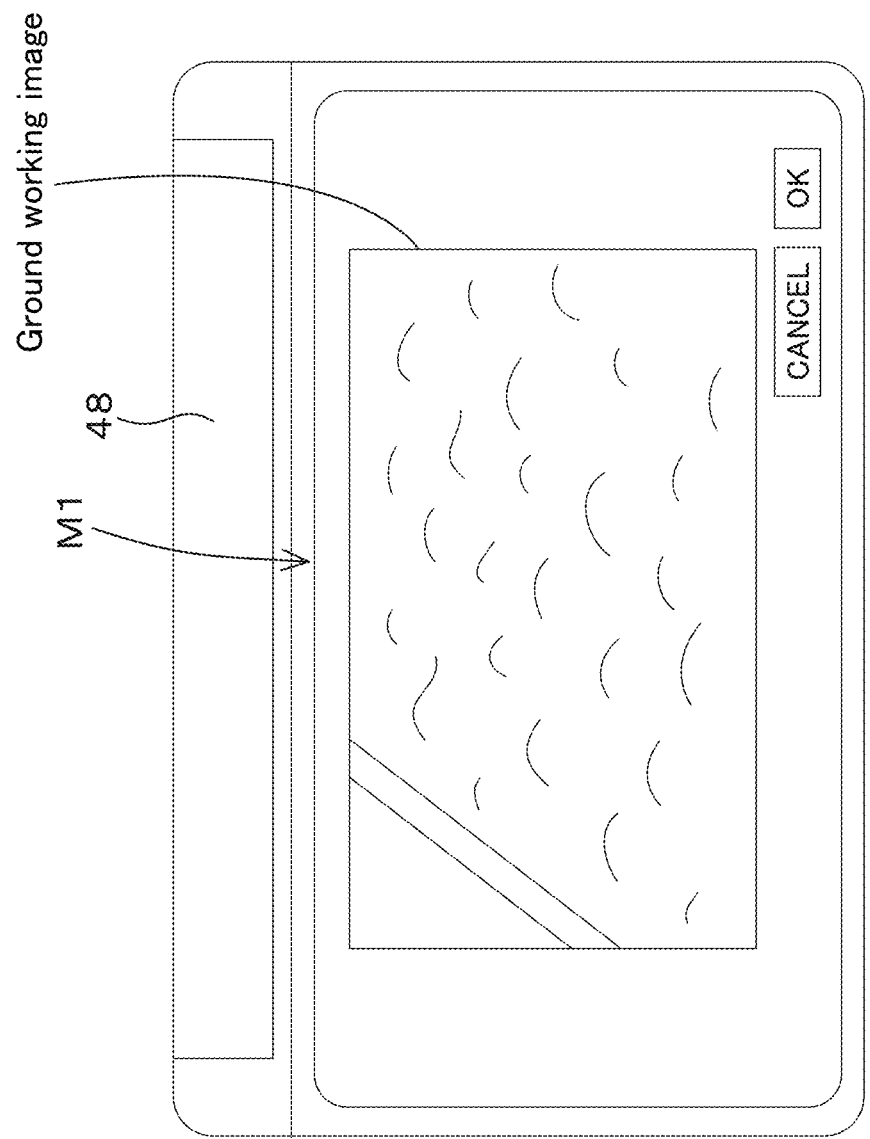
FIG. 6 is a view illustrating an example of an imaging screen M1.

As shown in FIG. 6, the display 48 displays ground working images (that is, single images and composite images) taken by the imaging devices 50. The display 48 is located near the driver seat 10, so that an operator (that is, a driver) sitting on the driver seat 10 can check a ground working image displayed on the display 48 while facing the front of the vehicle body 3. When the driver performs a predetermined operation on an operation tool such as a switch located near the driver seat 10, the display 48 displays an imaging screen M1 in response to, for example, an operation of the lifting switch 101, an operation of a switch to engage or disengage the PTO clutch 15, or an operation of a switch to start the imaging devices 50 taking an image. On the imaging screen M1, the ground working images (that is, a single image and a composite image) are displayed.

The storage 51 stores ground working images taken by the imaging devices 50. The storage 51 includes a non-volatile memory or the like. In the storage 51, the first data acquisition unit 60a stores individual images, composite images, or the like.

For example, the storage 51 stores operation information of the vehicle body 3 and at least one ground working image (that is, an individual image or a composite image) in association with each other. The operation information of the vehicle body 3 is data of the vehicle body 3 (that is, the tractor 1) at least when ground working is being performed by the ground working machine 2, such as a revolving speed of the prime mover 4, a vehicle speed, an operation extent of an acceleration pedal, a load rate of the prime mover 4, a working posture, and autonomous traveling data. The working posture is tilting (that is, an angle) of the ground working machine 2 under a posture control, and can be obtained based on a telescopic state of the changeover cylinder 25a. The autonomous traveling data is a vehicle position (that is, a traveling track), a traveling direction of the vehicle body 3 (that is, a vehicle orientation), presence or absence of untraveled areas, a slip rate, and the like, which are detected by the positioning device 40. The untraveled areas can be obtained by determining traveled areas where the ground working machine 2 has traveled in an agricultural field based on the scheduled traveling line R1, a vehicle position, and a working width of the ground working machine 2, and setting areas other than the traveled areas as the untraveled areas. The slip rate can be obtained based on a relationship between a rotational speed of the wheels and a vehicle speed.

The storage 51 stores, for example, a prime mover revolving speed, a vehicle speed, an operation extent of an acceleration pedal, a load rate of a prime mover, tilting (angle) of the ground working machine 2, a traveling track, a vehicle orientation, presence or absence of untraveled areas, a slip rate, and the like.

The tractor 1 is provided with a working grading unit 115 configured or programmed to grade ground working. The working grading unit 115 includes electrical and electronic circuits provided in the controller 60, computer programs stored in the controller 60, or the like. Or, the working grading unit 115 includes electrical and electronic circuits provided in the display 48, computer programs stored in the display 48, or the like.

The working grading unit 115 grades ground working based on a first ground surface condition obtained from ground working images (that is, a single image and a composite image) after ground working and a second ground surface condition (that is, a reference grading data) that is a reference ground condition for the ground working. In the storage 51, various second ground surface conditions are stored in correspondence to various kinds of ground workings performed by the respective kinds of ground working machines 2. The second ground surface condition is, for example, a condition of unevenness of a ground surface after ground working is performed by the ground working machine 2.

Figure 7A:
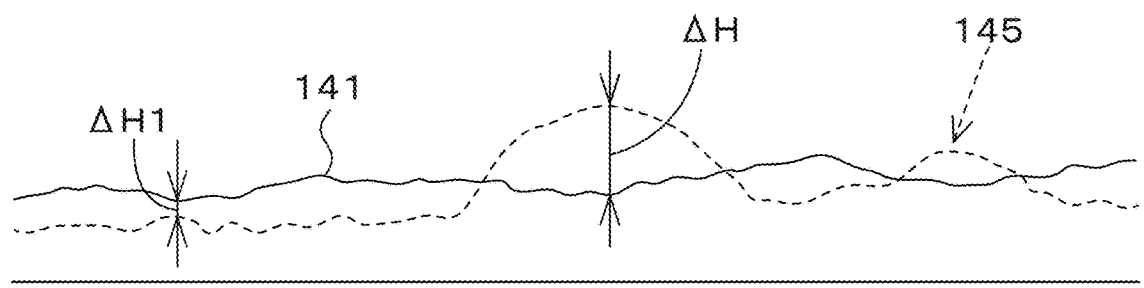
FIG. 7A is a view illustrating an example of ground working performed by a rotary cultivator.
Figure 7B:
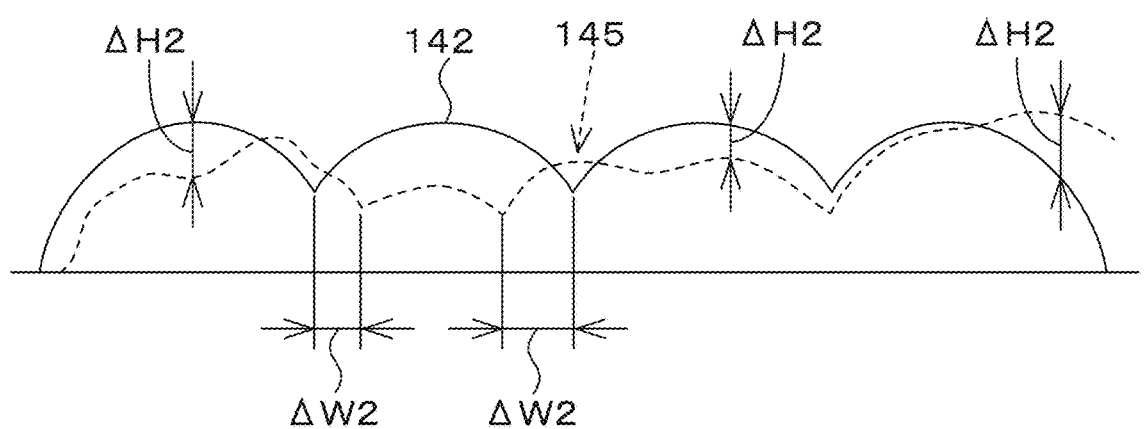
FIG. 7B is a view illustrating an example of ground working performed by a plow.
Figure 7C:
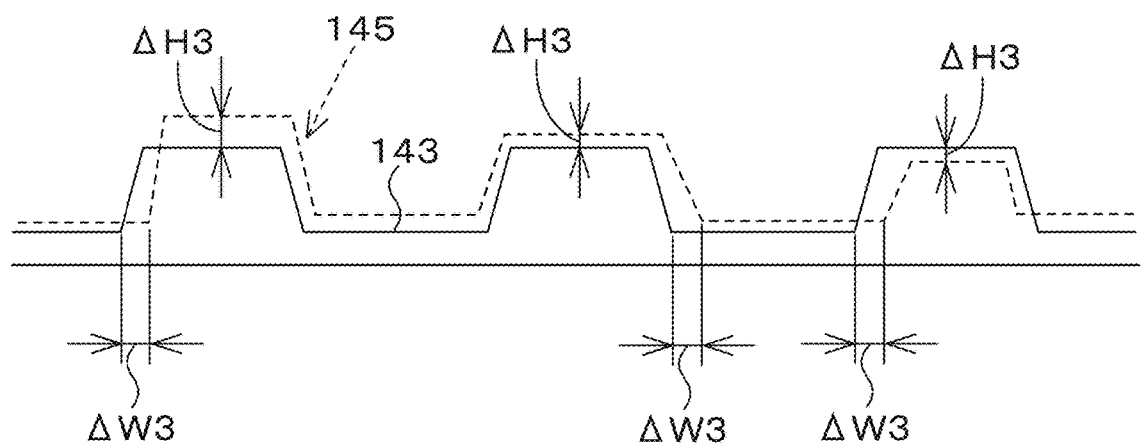
FIG. 7C is a view illustrating an example of ground working performed by a ridger.

As shown in FIG. 7A, the storage 51 stores, as the second ground surface condition, unevenness 141 of a ground surface in a width direction of a rotary cultivator after the rotary cultivator performs ground working. As shown in FIG. 7B, the storage 51 stores, as the second ground surface condition, unevenness 142 of a ground surface in a width direction of a plow after the low performs ground working. As shown in FIG. 7C, the storage 51 stores, as the second ground surface condition, unevenness 143 of a ground surface in a width direction of a ridger after the ridger performs ground working.

The unevenness 141, 142, and 143 are data each represented in a coordinate system with a width direction (that is, an X-axis direction) and a height direction (that is, a Y-axis direction), for example, represented by a line connecting the coordinates of the X-axis and Y-axis. The unevenness 141, 142, and 143 represent standard shapes after ground workings by a rotary cultivator, plow, and ridger, and are obtained, for example, through simulation, based on working results, or the like.

The working grading unit 115 calculates the first ground surface condition representing unevenness of a ground surface based on ground working images (that is, single images and composite images) after ground working. The working grading unit 115 calculates the unevenness (that is, the first ground surface condition) 145 after ground working through image processing of ground working images.

Figure 8A:
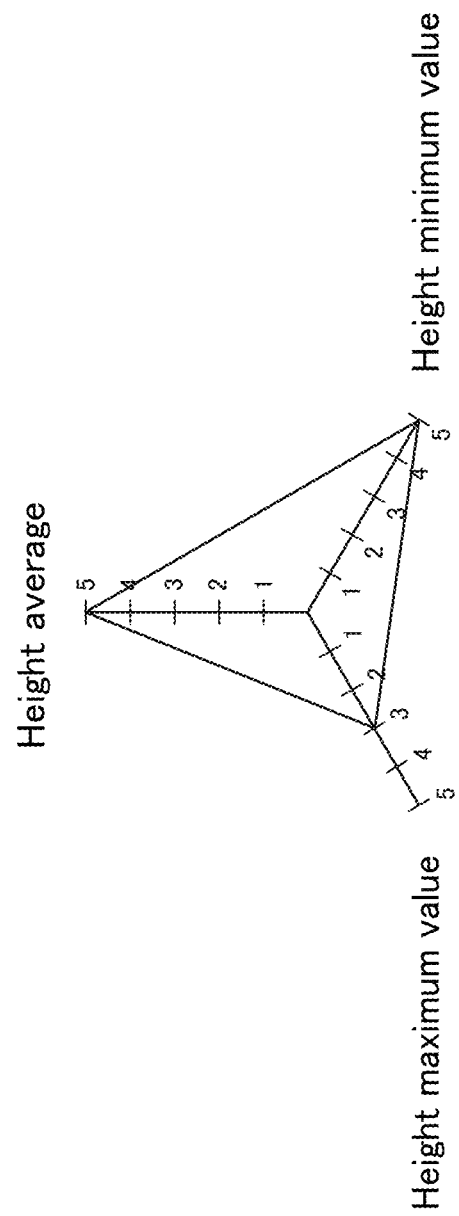
FIG. 8A is a view illustrating an example of grading to the rotary cultivator.

When the ground working device 2 is a rotary cultivator, the working grading unit 115 refers to the unevenness (that is, the second ground surface condition) 141 corresponding to the rotary cultivator stored in the storage 51 and compares the unevenness (that is, the second ground surface condition) 141 with the unevenness (that is, the first ground surface condition) 145. The working grading unit 115 performs grading based on, for example, a difference $\Delta H1$ in a height direction (referred to as a height deviation) between the unevenness (that is, the second ground surface condition) 141 and the unevenness (that is, the first ground surface condition) 145. The working grading unit 115 calculates a height average value, a height maximum value, a height minimum value, and the like of the height deviation $\Delta H1$, and performs grading at multiple levels (that is, stages) for magnitudes of a height average value, a height maximum value, and a height minimum value, respectively, as shown in a radar chart in FIG. 8A. FIG. 8A illustrates: the larger a numerical value of the level in the radar chart is, the higher the grading is; and the largest level indicates that the height deviation $\Delta H1$ is small.

When the ground working device 2 is a plow, the working grading unit 115 refers to the unevenness (that is, the second ground surface condition) 142 corresponding to the plow stored in the storage 51 and compares the unevenness (that is, the second ground surface condition) 142 with the unevenness (that is, the first ground surface condition) 145. The working grading unit 115 performs grading based on, for example, a difference $\Delta W2$ in a width direction (referred to as a width deviation) and a difference $\Delta H2$ in a height direction (referred to as a height deviation) between the unevenness (that is, the second ground surface condition) 142 and the unevenness (that is, the first ground surface condition) 145. The working grading unit 115 calculates a width average value, a width maximum value, and a width minimum value of the width deviation $\Delta W2$, a height average value, a height maximum value, a height minimum value of the height deviation $\Delta H2$, and the like and performs grading at multiple levels (that is, stages) for magnitudes of a width average value, a width maximum value, a width minimum value, a height average value, a height maximum value, and a height minimum value, respectively, as shown in a radar chart in FIG. 8B. FIG. 8B also illustrates: the larger a numerical value of the level in the radar chart is, the higher the grading is; and the largest level indicates that the width deviation $\Delta W2$ and the height deviation $\Delta H2$ are small.

When the ground working device 2 is a ridger, the working grading unit 115 refers to the unevenness (that is, the second ground surface condition) 143 corresponding to the ridger stored in the storage 51 and compares the unevenness (that is, the second ground surface condition) 143 with the unevenness (that is, the first ground surface condition) 145. The working grading unit 115 performs grading based on, for example, a difference $\Delta W3$ in a width direction (referred to as a width deviation) and a difference $\Delta H3$ in a height direction (referred to as a height deviation) between the unevenness (that is, the second ground surface condition) 143 and the unevenness (that is, the first ground surface condition) 145. The working grading unit 115 calculates a width average value, a width maximum value, and a width minimum value of the width deviation $\Delta W3$, a height average value, a height maximum value, and a height minimum value of the height deviation $\Delta H3$, and the like and performs grading at multiple levels (that is, stages) for magnitudes of a width average value, a width maximum value, a width minimum value, a height average value, a height maximum value, and a height minimum value, respectively, as shown in a radar chart in FIG. 8C. FIG. 8C also illustrates: the larger a numerical value of the level in the radar chart is, the higher the grading is; and the largest level indicates that the width deviation $\Delta W3$ and the height deviation $\Delta H3$ are small.

The grading method in the working grading unit 115 described above is just an example and is not limited thereto. For example, when the ground working device 2 is a rotary cultivator, a difference between a flatness value of the first ground surface condition and a flatness value of the second ground surface condition may be graded at levels. In the case where the ground working machine 2 is a plow, variations in changing of the unevenness 142 in a width direction, that is, the variation in distance between a valley portion and a mountain portion, may be graded at multiple levels. In the case where the ground working machine 2 is a ridger, spacings of the unevenness 143 (that is, a clearance between ridges) and flatness of ridge surfaces may be graded at multiple levels. The grading may also be based on shapes of the unevenness (that is, the first ground surface condition) 145. For example, when the shapes of the unevenness (that is, the first ground surface condition) 145 and the shapes of the unevenness 141, 142, and 143 are compared and are close (similar) to each other, the grading is made higher (that is, the leveling is made higher), and when the shapes are not similar to each other, the grading is made lower (that is, the leveling is made lower).

Figure 9:
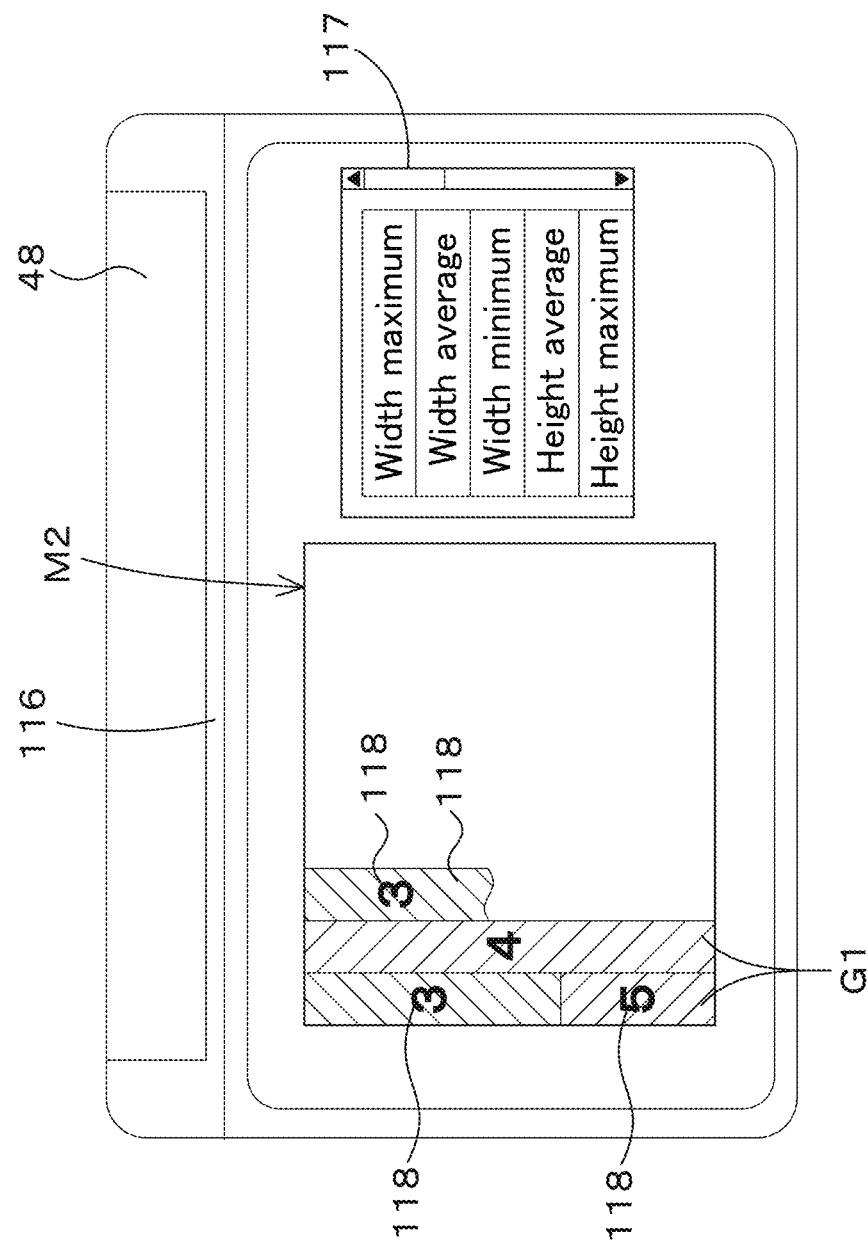
FIG. 9 is a view illustrating an example of a grading screen M2.

The display 48 displays the grading result 118 graded by the working grading unit 115. As shown in FIG. 9, the display 48 displays a grading screen M2 when a predetermined operation is performed on the display 48. The imaging screen M1 and the grading screen M2 may be integrated into a single screen. For convenience of explanation, FIG. 9 shows a portion of the traveling track G1 and the grading result 118 in an agricultural field.

In the grading screen M2, a vehicle position (that is, the traveling track) G1 detected by the positioning device 40 is displayed on the screen fold 116. In addition, the grading screen M2 displays a grading selection portion 117 to select items to be displayed as grading results. The grading selection portion 117 includes selectable items such as a width average value, a width maximum value, a width minimum value, a height average value, a height maximum value, a height minimum value, a flatness value, and an overall grading. Each of the items in the grading selection portion 117 can be selected, for example, by a switch provided on the display 48 or, when the display 48 is a touch panel, by operating the grading screen M2 with a finger or the like.

When the width average value is indicated in the grading selection portion 117, the display 48 displays a level, which is the grading result 118 for the width average value, on the traveling track G1.

Similarly, when any one of the following items is selected in the grading selection portion 117: a width maximum value, a width minimum value, a height average value, a height maximum value, a height minimum value, a flatness value, and an overall grading, the display 48 displays a level that is the grading result 118 for the selected item on the traveling track G1. The overall grading is a numerical value obtained through a predetermined function, formula, or the like.

The controller 60 may change a traveling condition of the vehicle body 3 based on the ground working image taken by the imaging devices 50. For example, in the case where the ground working device 2 performs working in autonomous traveling, the controller 60 compares the unevenness (that is, the first ground surface condition) 145 obtained based on the ground working image with the unevenness (that is, the second ground surface condition) 141, 142, and 143, and changes, for example, a vehicle speed as a traveling condition when deviations (the width deviations $\Delta W2$ and $\Delta W3$, the height deviations $\Delta H1$, $\Delta H2$, and $\Delta H3$) between the unevenness (that is, the first ground surface condition) 145 and the unevenness (that is, the second ground surface condition) 141, 142, and 143 are greater than a predetermined threshold.

Figure 10:
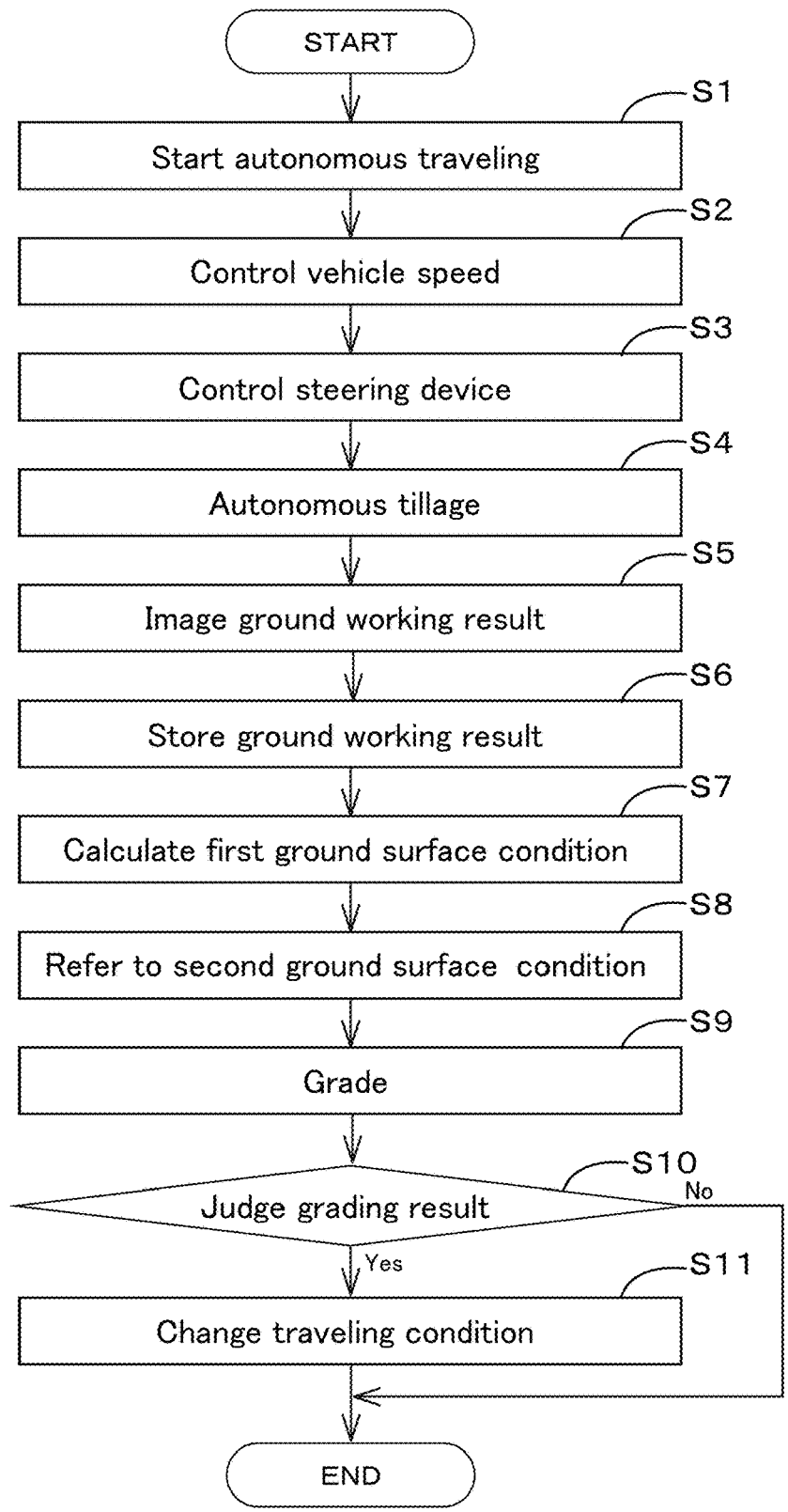
FIG. 10 is a flowchart of changing a traveling condition of a vehicle body in the ground working.

FIG. 10 shows a flowchart for changing the traveling condition of the vehicle body 3 when a rotary cultivator performs ground working. For convenience of explanation, a rotary cultivator is described, but the flowchart can also be applied to other ground working machines 2.

As shown in FIG. 10, when autonomous traveling starts (step S1), the autonomous traveling controller 200 controls the transmission device 5 and the like so that a vehicle speed of the tractor 1 becomes a speed set corresponding to the scheduled traveling line R1 (step S2). Also, the autonomous traveling controller 200 controls the steering device 11 based on a vehicle position measured by the positioning device 40 and the scheduled traveling line R1 (step S3). In addition, the autonomous traveling controller 200 performs autonomous tillage when a tillage depth is set in advance (step S4).

Figure 11:
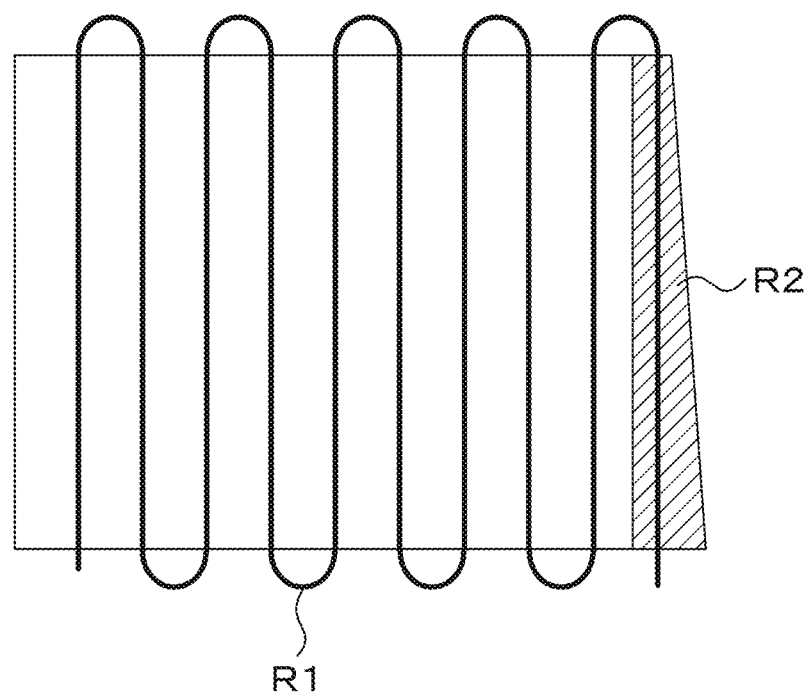
FIG. 11 is an explanation view explaining a cultivated field.

The imaging devices 50 images a ground working result in a state where the ground working is being performed (step S5). An imaged ground working image, which is the ground working result, is temporarily stored in the storage 51 (step S6). The working grading unit 115 calculates the first ground surface condition by performing image processing on the ground working image (step S7). The working grading unit 115 refers to the second ground surface condition (that is, reference grading data) corresponding to a rotary cultivator by referring to the storage 51 (step S8), and performs grading by comparing the referred second ground surface condition with the first ground surface condition (step S9: a grading process). It is judged whether the grading result in the grading process is good or not (step S10: a grading judgment process). In the grading judgment process, when the height deviation $\Delta H1$ is large and plowing is not being performed to a sufficient depth when the second ground surface condition is compared with the first ground surface condition, when there are places where tillage is not being performed because the height deviation $\Delta H1$ continues to be large, or when there are places where the height deviation $\Delta H1$ is suddenly large because of soil clods, the grading results are judged to be not good. In the grading judgment process, when the grading result is not good (step S10, Yes), the controller 60 changes the traveling condition (step S11: a traveling change process). In the traveling change process, the controller 60 decides to change the traveling condition based on the operation information of the vehicle body 3 (a prime mover revolving speed, a vehicle speed, an operation extent of acceleration pedal, a load ratio of the prime mover 4) stored in the storage 51 and the grading results. For example, the controller 60 uses a simulation model, an evaluation function, or the like to obtain a prime mover revolving speed, a vehicle speed, an operation extent of acceleration pedal, and a load rate of the prime mover 4 such that the height deviation $\Delta H1$ becomes small. In the traveling change process, when a prime mover revolving speed, a vehicle speed, an operation extent of acceleration pedal, and a load rate of the prime mover 4 such that the height deviation $\Delta H1$ becomes small are obtained, the vehicle speed (that is, a set vehicle speed) set for the scheduled traveling line R1 is increased or decreased, or the prime mover revolving speed is increased or decreased, for example, in response to the obtained results. As shown in FIG. 11, when there is a place where tillage has not been done (that is, an untraveled portion) R2, the controller 60 temporarily changes the autonomous traveling for traveling on the scheduled traveling line R1 in the traveling change process, and steers the steering device 11 so that the vehicle body 3 travels on the untraveled portion R2.

In the above-mentioned preferred embodiment, the traveling condition of the vehicle body 3 is changed based on the ground working image, that is, the first ground surface condition obtained from the ground working image, but the ground working result of the ground working device 2 may also be changed. A modified example of the case where the ground working result of the ground working machine 2 is changed will be described.

The tractor 1 is provided with a second data acquisition unit 60b configured or programmed to acquire operation information of the ground working machine 2 and the ground working image. Similar to the first data acquisition unit 60a, the second data acquisition unit 60b acquires individual images taken by the plurality of imaging devices 50, for example, the plurality of individual images taken by the respective left, right and rear imaging devices 50a, 50b and 50c on the tractor 1. Alternatively, the second data acquisition unit 60b acquires a composite image after combining the plurality of ground working images taken by the respective left, right and rear imaging devices 50a, 50b and 50c into a single image, in the same manner as the first data acquisition unit 60a. Alternatively, the second data acquisition unit 60b acquires a single image taken by one imaging device 50.

The storage 51 stores the plurality of individual images, the composite image, or the like acquired by the second data acquisition unit 60b. For example, the storage 51 stores operation information of the ground working device 2 and the ground working images (that is, the individual images or the composite image) in correspondence with each other. The operation information of the ground working device 2 is data regarding the ground working device 2 acquired when the ground working device 2 operates. For example, in the case of a rotary cultivator, the information is a rotation speed of a rotary shaft to which cultivating claws are attached (that is, a rotary shaft rotation speed), a cultivation load (that is, a loading) applied to the rotary shaft, and the like. In the case of a plow, the information is a cultivation load (that is, a loading) applied to a cultivating portion, an angle and height of the cultivating portion, and the like. In the case of a ridger, the load applied to a ridging portion, an angle and height of the ridging portion, and the like. The rotary shaft rotation speed, the cultivating load, the angle and height of the cultivating portion, and the load, angle, and height of the ridging portion can be detected by sensors or the like mounted on the ground working machine 2. The rotary shaft rotation speed, the cultivating load, the angle and height of the cultivating portion, and the load, angle, and height of the ridging portion may be obtained from ground working images taken by the imaging devices 50.

In this case, the storage 51 stores the rotary shaft rotation speed, the cultivating load, the angle and height of the cultivating portion, the load, angle, and height of the ridging portion, and the like, for example.

When the grading result in the working grading unit 115 is not good, the controller 60 changes a ground working result (that is, performs a working change process). In the working change process, the controller 60 determines to change a ground working result based on the operation information of the ground working device 2 (such as a rotary shaft rotation speed, a cultivating load, an angle and height of a cultivating portion, and/or a load, an angle, and a height of a ridging portion) stored in the storage 51 and grading results. For example, the controller 60 uses a simulation model, an evaluation function, or the like to calculate a rotary shaft rotation speed, a cultivating load, an angle and height of a cultivating portion, and/or a load, an angle, and a height of a ridging portion so as to reduce the height deviations $\Delta H1$ to $\Delta H3$ and the width deviations $\Delta W2$ and $\Delta W3$. When the controller 60 obtains the calculation results, e.g., the rotary shaft rotation speed, the cultivating load, the angle and height of the cultivating portion, and/or the load, angle, and height of the ridging portion, so as to reduce the height deviations $\Delta H1$ to $\Delta H3$ and the width deviations $\Delta W2$ and $\Delta W3$, the controller 60 outputs a control signal to change an operation to the ground working device 2 in response to the calculation results. The controller on the ground working machine 2 (referred to as, a machine-side control device) changes driving portions (a hydraulic cylinder, a hydraulic motor, a hydraulic switching valve, a hydraulic proportional valve, an electric motor, a reduction ratio, and the like) provided on the ground working machine 2 to change (correct) the rotary shaft rotation speed, the angle and height of the cultivating portion, and the load, angle, and height of a ridging portion, and the like based on the control signal.

As described above, the working vehicle 1 includes the imaging device 50 configured or programmed to image a ground working result after ground working by the ground working device 2, and the storage 51 configured or programmed to store a ground working image representing the ground working result taken by the imaging device 50. According to this configuration, the ground working results after working performed by the ground working device 2 can be taken by the imaging device 50 and the taken ground working images can be stored in the storage 51, so that conditions of an agricultural field, that is, the ground working result can be checked after working. For example, the ground working result after plowing and the ground working result after ridging can be confirmed based on the ground working images stored in the storage 51.

The working vehicle 1 includes the first data acquisition unit 60a configured or programmed to acquire the ground working image and operation information of the vehicle body 3, wherein the storage 51 stores the ground working image and the operation information acquired by the first data acquisition unit 60a. According to this configuration, not only the ground working can be confirmed based on the ground working image, but also how an operation of the vehicle body 3 was performed can be confirmed in the ground working result based on the operation information.

The working vehicle 1 includes the second data acquisition unit 60b configured or programmed to acquire the ground working image and operation information of the ground working device 2, wherein the storage 51 stores the ground working image and the operation information acquired by the second data acquisition unit 60b. According to this configuration, not only the ground working can be confirmed based on the ground working image, but also how an operation of the ground working machine 2 was performed can be confirmed in the ground working result based on the operation information.

The working vehicle 1 includes the display 48 configured or programmed to display the ground working image including the ground working result. According to this, by looking at the display 48 while the operator is riding in the working vehicle 1, the operator can grasp the ground working result while performing the ground work.

The imaging device 50 images, as the ground working result, a ground surface condition after the ground working. According to this configuration, the ground surface condition after plowing or ridging can be easily checked, for example.

The working vehicle 1 includes the working grading unit 115 configured or programmed to grade the ground working based on the ground working image taken by the imaging device 50. The working grading unit 115 is capable of easily grading the ground working with use of the ground working image.

The working grading unit 115 performs the grading based on the first surface condition obtained from the ground working image after the ground working and the second surface condition serving as a reference for the ground working. According to this configuration, it is easy to grade how the first ground surface condition after the ground working is in comparison with the second ground surface condition to be used as a reference.

The working vehicle 1 includes the display 48 configured or programmed to display a grading result graded by the working grading unit 115. According to this configuration, an operator can easily know the grading results for the ground working by looking at the display 48.

The working vehicle 1 includes the controller 60 configured or programmed to change, based on the ground working image, a traveling condition of the vehicle body 3 or the ground working to be performed by the ground working device 2. According to this configuration, when the ground working condition obtained from the ground working image is poor or the like, the controller 60 can automatically change the traveling condition of the vehicle body 3 or the ground working performed by the ground working machine 2, so that the ground working condition can be corrected (modified) and the ground working condition can be improved totally in the agricultural field.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A working vehicle comprising:
 a vehicle body configured to travel;
 a ground working device, among a plurality of types of ground working devices, attached to the vehicle body to perform ground working;
 an imaging device located on the vehicle body to image, as a ground working result, a ground surface condition after the ground working by the ground working device;

a storage to store a ground working image representing the ground working result taken by the imaging device; and a controller configured or programmed to function as a working grader to grade the ground working result based on the ground working image; wherein the storage is configured or programmed to store a plurality of reference ground surface conditions respectively corresponding to the plurality of types of ground working devices; and the working grader is operable to:

calculate a first ground surface condition from the ground working image;

refer to a second ground surface condition which is one of the reference ground surface conditions stored in the storage that corresponds to the ground working device among the plurality of types of ground working devices; and grade the ground working result based on a comparison between the first ground surface condition and the second ground surface condition.

2. The working vehicle according to claim 1, further comprising:

a prime mover; wherein the controller is configured or programmed to function as a first data acquirer to acquire the ground working image and operation information of the vehicle body including a vehicle speed and a rotation speed of the prime mover; and the storage is configured or programmed to store the ground working image and the operation information acquired by the first data acquirer in association with each other.

3. The working vehicle according to claim 1, wherein the controller is configured or programmed to function as a second data acquirer to acquire the ground working image and operation information of the ground working device from a sensor or the imaging device, the operation information including a rotation speed of a rotary shaft of the ground working device, a load, an angle, or a height of the ground working device; and the storage is configured or programmed to store the ground working image and the operation information acquired by the second data acquirer in association with each other.

4. The working vehicle according to claim 1, further comprising:

a display configured or programmed to display the ground working image including the ground working result and a grading selection portion for selecting an item among a plurality of items of the ground working result graded by the working grader; wherein the display is configured or programmed to display, in a grading screen, a traveling track of the vehicle body and display, on the traveling track, a plurality of levels of the ground working result corresponding to the item selected in the grading selection portion.

5. The working vehicle according to claim 2, wherein the controller is configured or programmed to change a traveling condition of the vehicle body or the ground working to be performed by the ground working device by increasing or reducing a speed of the vehicle body and a rotation speed of the prime mover based on the operation information of the vehicle body and a level of the ground working result provided by the working grader.

6. The working vehicle according to claim 3, wherein the controller is configured or programmed to change a working condition of the ground working device by outputting a control signal to the ground working device based on the operation information of the ground working device and a level of the ground working result provided by the working grader.

7. The working vehicle according to claim 1, wherein the working grader is operable to:

calculate at least one of (i) a deviation in a height direction of an uneven shape of a ground surface represented by the first ground surface condition from an uneven shape of a reference ground surface represented by the second ground surface condition, or (ii) a deviation in a width direction of the uneven shape of the ground surface represented by the first ground surface condition from the uneven shape of the reference ground surface represented by the second ground surface condition; and grade the ground working result based on at least one of (i) the calculated deviation in the height direction, or (ii) the calculated deviation in the width direction.

8. The working vehicle according to claim 1, wherein the working grader is operable to:

calculate at least one of (i) an average value, a maximum value, or a minimum value of a deviation in a height direction of an uneven shape of a ground surface represented by the first ground surface condition from an uneven shape of a reference ground surface represented by the second ground surface condition, or (ii) an average value, a maximum value, or a minimum value of a deviation in a width direction of the uneven shape of the ground surface represented by the first ground surface condition from the uneven shape of the reference ground surface represented by the second ground surface condition; and grade at least one of (i) the calculated average value, the calculated maximum value, or the calculated minimum value of the deviation in the height direction, or (ii) the calculated average value, the calculated maximum value, or the calculated minimum value of the deviation in the width direction on a multiple-level scale according to a magnitude thereof.

9. The working vehicle according to claim 8, wherein, when the ground working device is a rotary cultivator, the working grader is operable to:

calculate the average value, the maximum value, or the minimum value of the deviation in the height direction of the uneven shape of the ground surface represented by the first ground surface condition from the uneven shape of the reference ground surface represented by the second ground surface condition corresponding to the rotary cultivator; and grade the calculated average value, the calculated maximum value, or the calculated minimum value of the deviation in the height direction.

10. The working vehicle according to claim 8, wherein, when the ground working device is a plow, the working grader is operable to:

calculate the average value, the maximum value, or the minimum value of the deviation in the height direction of the uneven shape of the ground surface represented by the first ground surface condition from the uneven shape of the reference ground surface represented by the second ground surface condition corresponding to the plow, and calculate the average value, the maximum value, or the minimum value of the deviation in the width direction of the uneven shape of the ground surface represented by the first ground surface condition from the uneven shape of the reference ground surface represented by the second ground surface condition corresponding to the plow; and grade the calculated average value, the calculated maximum value, or the calculated minimum value of the deviation in the height direction, and the calculated average value, the calculated maximum value, or the calculated minimum value of the deviation in the width direction.

11. The working vehicle according to claim 8, wherein, when the ground working device is a ridger, the working grader is operable to:

calculate the average value, the maximum value, or the minimum value of the deviation in the height direction of the uneven shape of the ground surface represented by the first ground surface condition from the uneven shape of the reference ground surface represented by the second ground surface condition corresponding to the ridger, and calculate the average value, the maximum value, or the minimum value of the deviation in the width direction of the uneven shape of the ground surface represented by the first ground surface condition from the uneven shape of the reference ground surface represented by the second ground surface condition corresponding to the ridger; and grade the calculated average value, the calculated maximum value, or the calculated minimum value of the deviation in the height direction, and the calculated average value, the calculated maximum value, or the calculated minimum value of the deviation in the width direction.

* * * * *